United States Patent
Galtier et al.

[11] Patent Number: 5,859,694
[45] Date of Patent: Jan. 12, 1999

[54] OPTICAL VELOCIMETER PROBE

[75] Inventors: Frédéric Galtier, Montpellier; Olivier Besson, Toulouse, both of France

[73] Assignee: Sextant Avionique, Velizy Villacoublay, France

[21] Appl. No.: 876,236

[22] Filed: Jun. 16, 1997

[30] Foreign Application Priority Data

Jun. 18, 1996 [FR] France .................................. 96 07536

[51] Int. Cl.$^6$ ................................................ G06F 15/332
[52] U.S. Cl. .......................................................... 356/28.5
[58] Field of Search ..................... 356/28.5, 27; 364/484

[56] References Cited

U.S. PATENT DOCUMENTS

| | | |
|---|---|---|
| 3,738,750 | 6/1973 | Kalb et al. . |
| 4,899,289 | 2/1990 | Appel ........................................ 364/484 |
| 5,005,144 | 4/1991 | Nakajima et al. . |
| 5,289,391 | 2/1994 | Ibrahim et al. ........................ 364/570 |
| 5,383,024 | 1/1995 | Maxey et al. ............................ 356/336 |

FOREIGN PATENT DOCUMENTS 0 268 519  5/1988  European Pat. Off. .
0 645 645  3/1995  European Pat. Off. .

OTHER PUBLICATIONS

Patent Abstracts of Japan, vol. 12, No. 411., Oct. 31, 1988, & JP 63–147265, Jun. 20, 1988.

Patent Abstracts of Japan, vol. 17, No. 36, Jan. 22, 1993, & JP 4–254768, Sep. 10, 1992.

*Primary Examiner*—Mark Hellner
*Attorney, Agent, or Firm*—Oblon, Spivak, McClelland, Maier & Neustadt, P.C.

[57] ABSTRACT

An optical velocimeter probe a device to illuminate a volume of measurement in which there may pass particles, and an optical detector to produce an electrical signal x(t) in response to the passage of a particle in the illuminated volume. It also includes a device to extract information representing the velocity v of particles from the electrical signal, including, in particular, a device to convert the electrical signal x(t) into a complex signal $\tilde{x}(t)$, an apparatus to set up a self-correlation function $r_{\tilde{x}}(m)$ of the signal x(t), and a device to estimate the velocity v from the computation of the phase $\phi_{\tilde{x}}(m)$ of the function $r_{\tilde{x}}(m)$.

7 Claims, 2 Drawing Sheets

OPTICAL VELOCIMETER PROBE

BACKGROUND OF THE INVENTION

1. Field of the Invention

The field of the invention is that of optical velocimeter probes used to define the velocity of particles in relative motion with respect to the probe.

2. Description of the Prior Art

At present, there are optical devices with two laser beams that interfere with each other so as to generate an ellipsoidal volume of measurement consisting of equidistant dark and luminous fringes. When a particle in motion goes through this volume of measurement, the signal collected by a photodetector includes indications on the velocity of this particle with respect to the optical probe. It is therefore possible, by analyzing the signal collected, to define the velocity of a particle considered.

This type of probe can be used to define the velocity of any particle that is small enough in relation to the interference fringes created and especially to define the speed of an aircraft, where the relative velocity of particles in the air in relation to said aircraft equipped with this type of velocimeter probe is known.

Indeed, with advances in terms of the miniaturization and cost of laser sources and especially laser diodes, it is becoming possible to make optical velocimeter probes of this kind, set up on board aircraft whose speed is to be measured.

The performance characteristics of this type of probe directly depend on the means of analysis of the signal collected by a photodetector for the extraction therefrom of the velocity parameter. This is why an object of the invention is an optical velocimeter probe of the type described here above, comprising highly efficient means of determining velocity.

SUMMARY OF THE INVENTION

More specifically, an object of the invention is an optical velocimeter probe comprising means to illuminate a volume of measurement in which there may pass particles in relative motion with respect to the probe, and means of optical detection to produce an electrical signal in response to the passage of a particle in the illuminated volume of measurement, the frequency spectrum of this signal having a width centered on a dominant frequency $f_o$ representing the relative velocity of the particle with respect to the probe, this probe comprising digital means to set up a vector x(t) representing N digital samples of the electrical signal detected, wherein said probe comprises:

means to convert the electrical signal x(t) into a complex signal $\tilde{x}(t)$, means to set up a self-correlation function of the complex signal, said function being defined as follows:

$$r_{\hat{x}}(m) = \sum_{t=-N}^{N-m} E\{\hat{x}(t)\hat{x}(t+m)\}$$

where E{x} designates the mathematical expectation of the variable x.

means to determine the phase $\phi_{\hat{x}}(m)$ of the function $r_{\hat{x}}(m)$ related to the imaginary part of said function;

means to determine the frequency $f_o$ from the set of pairs $[m\phi_{\hat{x}}(m)]$;

means to provide an indication of velocity v of a particle with respect to the probe on the basis of the frequency $f_o$.

When the electrical signal given by the photodetector results from the light radiation back-reflected by a particle going through a volume of measurement defined by the interference fringes resulting from two light beams, the vector x(t) may be defined as follows:

$$x(t) = A \cdot e^{-2\alpha^2 f_t^2} \cos(2\pi ft) + w(t)$$

where $\alpha$ is a fixed coefficient, t denotes time, w(t) is a noise term.

The means used to convert the real signal x(t) into a complex signal $\tilde{x}(t)$ comprise a Hilbert filter type of $-\pi/2$ phase-shifter filter. This type of filter is used to define a complex signal $\tilde{x}(t)$ associated with the real signal x(t) whose real part is none other than the starting signal x(t) and whose imaginary part is the output of the Hilbert filter with x(t) at input, or again:

$$\tilde{x}(t) = x(t) + jT.H.[x(t)]$$

if T.H. is the Hilbert transform corresponding to the result of the filtering of the signal by the Hilbert filter.

According to one variant of the invention, the first and second means relating to the complex signal $\tilde{x}(t)$ and the self-correlation function $\hat{r}_x(m)$ implemented to determine the relative velocity may advantageously be combined as follows:

determining the discrete spectrum x(ω), of the signal computed by the fast Fourier transform (FFT) on the N samples;

defining the new spectrum $\hat{x}(\omega)$ $\hat{x}(\omega) = 2|x(\omega)|^2$ for ω>0

$\hat{x}(\omega) = 0$ for ω<0 determining the reverse Fourier transform of the spectrum $\hat{x}(\omega)$ to define the self-correlation function $\hat{r}_x(m)$ $$FFT^{-1}[\hat{x}(\omega)] = r_{\hat{x}}(m)$$

On the basis of all the self-correlation points $\hat{r}_x(m)$, all the phases $\phi_{\hat{x}}(m)$ are defined.

It is then possible to estimate the frequency $$f_o = \hat{f}_d = \frac{\omega_d}{2\pi}$$

in assuming that this frequency corresponds to the value for which the function $J(\phi_d)$ is the minimum with:

$$J(\omega_d) = \sum_{m=1}^{M} |\phi_{\hat{x}}(m) - m\omega_d|^2$$

as shall be explained further below.

All these means used in the invention shall be described in greater detail in the following description.

BRIEF DESCRIPTION OF THE DRAWINGS

The invention will be understood more clearly and other advantages shall appear from the following non-restrictive description made with reference to the appended drawings, of which.

MORE DETAILED DESCRIPTION

In general, the optical velocimeter probe of the invention has two optical beams interfering in a volume of measurement.

Figure 1:
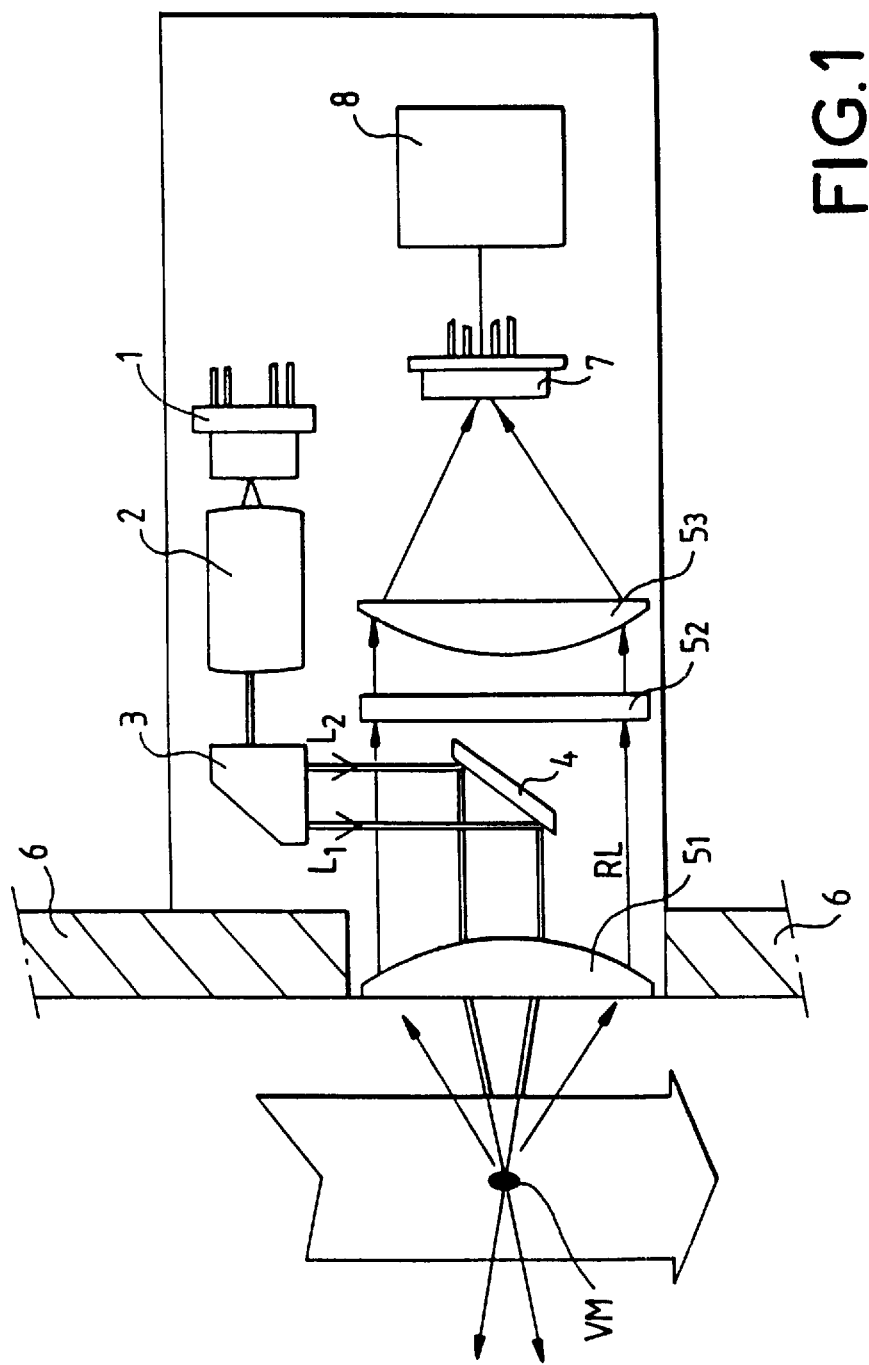
FIG. 1 illustrates an exemplary velocimeter probe according to the invention.

FIG. 1 illustrates an exemplary embodiment of a velocimeter probe mounted on board an aircraft. This velocimeter probe comprises a laser source 1, which may be a laser diode type of source, at output of which that is a collimator 2, an optical beam divider 3 creating two parallel optical beams L1 and L2 directed by means of a bending reflection system 4 towards an optical system 51 to exterior of the aircraft represented by the skin of the aircraft 6. The optical system 51 has the function of making the light beams L1 and L2 converge in an external volume called a volume of measurement MV, included in the atmosphere in which there flow the constituent particles of atmospheric aerosols. These aerosols send back the back-scattered light in the form of a light beam RL detected by the photodetector 7 which may typically be a photodiode, through optical systems 51, 52, 53.

At output of the photodiode, the velocimeter probe comprises means for the processing of the signal 8 comprising means for the conversion of the analog signal into a digital signal, means for the extraction of information on frequency and means to compute the relative velocity of the particles with respect to the aircraft.

Figure 2:
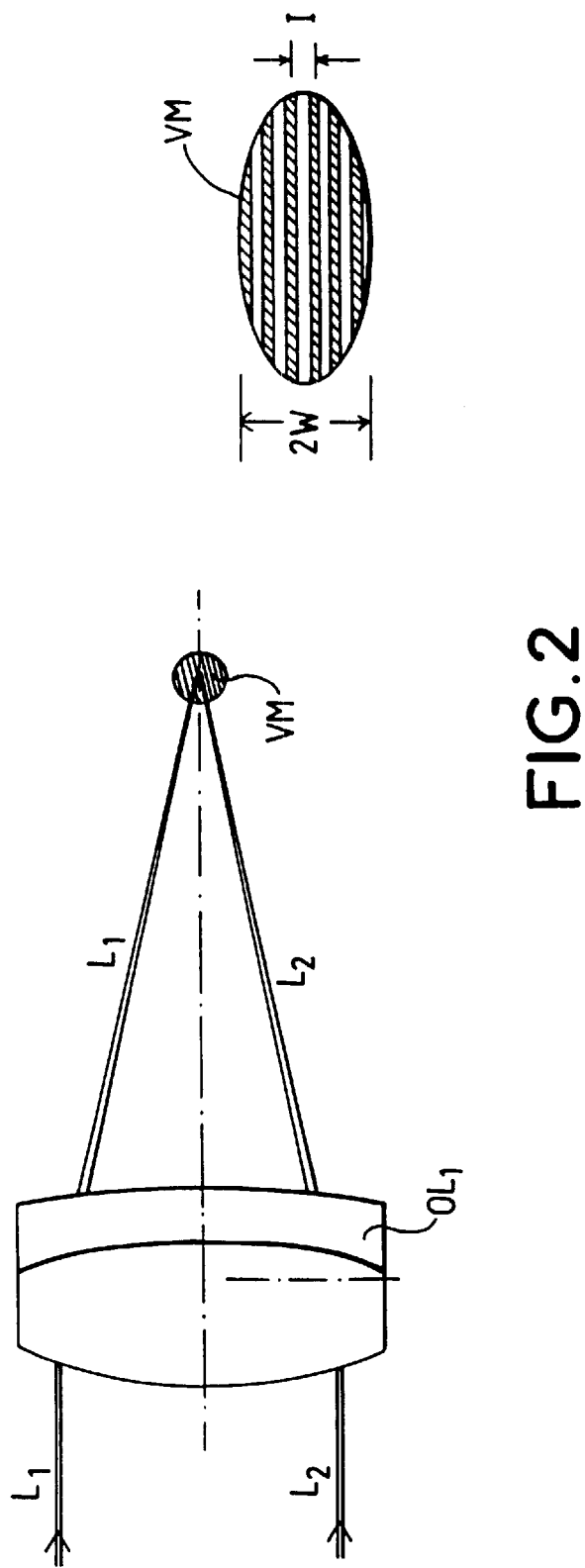
FIG. 2 represents the volume of measurement in which there pass the particles whose relative velocity is to be detected.

FIG. 2 gives a schematic view of the volume of measurement VM constituted by the interference fringes of the two optical beams L1 and L2. The width 2W represents the total width of this volume, I being the interfringe width.

The probe according to the invention comprises means 8 for the processing of the signal collected at the photodetector 7, used for the high precision defining of the velocity of a particle going through the volume of measurement VM.

We shall describe the means 8 in recalling first of all the following considerations:

When a particle having a relative velocity v with respect to the volume of measurement VM penetrates this system of interfringes, the light back-scattered by this particle and collected by the photodetector 5 gives a signal s(t) whose mathematical model is known:

$$s(t) = e^{-2(v/w)^2 t^2} \cos(2\pi v/I \cdot t)$$

with $t = 0, \pm 1, \ldots \pm 3w/v$ where
* v represents the velocity of the particle;
* 2w represents the total width of the interference fringes defining the volume of measurement as illustrated in FIG. 2;
* I represents the interfringe width;

with $\alpha = I/w$ and $f_d = v/I$ $$s(t) = A \cdot e^{-2\alpha^2 f_d^2 t^2} \cos(2\pi f_d t)$$

The phase term of the signal is the one that appears in the cosine modulation of the amplitude, namely $2\pi f_d t$. It can be then be shown, in considering the spectrum s(t), that the analytical signal associated with this spectrum is expressed by:

$$\hat{s}(t) = s(t) + j \cdot T.H.[s(t)]$$

if T.H. is the Hilbert transform of the temporal signal s(t), namely the result of the filtering of this signal by the Hilbert filter h(t), then $$\hat{s}(t) = s(t) + j[h(t) * s(t)]$$

or again $$\hat{s}(t) = e^{-2\alpha^2 f_d t^2} \cdot \cos(2\pi f_d t) + j e^{(-2\alpha^2 f_d^2 t^2)} \cos\left(2\pi f_d t - \frac{\pi}{2}\right)$$

$$= e^{-2\alpha^2 f_d t^2} e^{j(2\pi f_d t)}$$

In the real case of the velocimeter probe, the signal received by the photodetector comprises a noise term w(t) that may be considered to be a real white Gaussian noise with a mean value of zero and a variance $\sigma^2$.

Thus, the detected signal is the signal x(t) with x(t)=A s(t)+w(t) with A as the amplitude depending on the size of the particle of the incident light power and the coefficient of transmission of the receiver power.

We therefore have:

$$\hat{x}(t) = [As(t) + w(t)] + j \cdot T \cdot H[A \cdot s(t) + w(t)]$$
$$= A \cdot \hat{s}(t) + \hat{w}(t)$$
$$= A \cdot e^{-2\alpha^2 f_d^2 t^2} e^{j(2\pi f_d t)} + \hat{w}(t)$$

where $\hat{w}(t)$ is the analytical signal associated with the real noise w(t) and is a complex Gaussian white noise with a mean value of zero and the same variance $\sigma^2$.

Using the analytical signal $\hat{x}(t)$, M samples of the self-correlation function $\hat{r}_x(m)$ are defined with $$\hat{r}_x(m) = \sum_{t=-N}^{N-m} E\{\hat{x}^*(t)\hat{x}(t+m)\}$$

For a noise-infested sampled signal, the self-correlation function of this signal has a huge advantage over the temporal signal in the measurement where only the sample in m=0 is noise-infested.

It may therefore be considered, from $\hat{x}(t)=A.\hat{s}(t)+\hat{\omega}(t)$ and the associated correlation functions, namely:

$$\hat{r}_s(m) = \sum_{t=-N}^{N-m} \hat{s}^*(t)\hat{s}(t+m)$$

$$\hat{r}_\omega(m) = \sum_{t=-N}^{N-m} E\{\hat{w}^*(t)\hat{w}(t+m)\} = (2N+1-m)\sigma^2 \delta(m)$$

that $r_x(m) = A^2 r_s(m) + (2N+1-m)\sigma^2 \delta(m)$

More specifically, the self-correlation function $\hat{r}_x(m)$ may be written in the following form:

$$\hat{r}_s(m) = \sum_{t=-N}^{N-m} e^{-2\alpha^2 f_d t^2} \cdot e^{-j2\pi f_d t} \cdot e^{-2\alpha^2 f_d (t+m)^2} e^{j2\pi f_d (t+m)}$$

$$= \sum_{t=-N}^{N-m} e^{-2\alpha^2 f_d t^2} \cdot e^{2\alpha^2 f_d (t+m)^2} \cdot e^{j2\pi f_d m}$$

$$= \sum_{t=-N}^{N-m} e^{-4\alpha^2 f_d 2t(t+m)} \cdot e^{2\alpha^2 f_d^2 m^2} \cdot e^{j2\pi f_d m}$$

$$= \gamma(m) e^{-2\alpha^2 f_d^2 m^2} e^{j2\pi f_d m}$$

with $$\gamma(m) = \sum_{t=-N}^{N-m} e^{-4\alpha^2 f_d 2t(t+m)}$$

The phase of the self-correlation function $\hat{r}_s(m)$ is defined by $\phi_s(m) = 2\pi f_d m$.

It is thus possible to make an estimation on the desired frequency $2\pi \tilde{f}_d$ by searching for the minimum argument of the function $$\tilde{J}(\tilde{f}_d) = \sum_{m=1}^{M} |\phi_{\hat{x}}(m) - 2\pi f_d m|^2 \quad 5$$

This amounts to searching for the value for which the prime derivative function $J'(f_d)$ is zero. Namely again with $\omega_d = 2\pi f_d$.

$$J(\omega_d) = \sum_{m=1}^{M} |\phi_{\hat{x}}(m) - m\omega_d|^2$$

$$= \sum_{m=1}^{M} \phi_{\hat{x}}^2(m) - 2\phi_{\hat{x}}(m)m\omega_d + m^2\omega_d^2$$

$$J'(\omega_d) = \sum_{m=1}^{M} -2\phi_{\hat{x}}(m)m + 2m^2\omega_d$$

$$= +2 \sum_{m=1}^{M} m[m\omega_d - \phi_{\hat{x}}(m)]$$

$$J'(\tilde{\omega}_d) = 0 \Longrightarrow \sum_{m=1}^{M} m^2 \tilde{\omega}_d = \sum_{m=1}^{M} m\phi_{\hat{x}}(m)$$

$$\text{Or again } \tilde{\omega}_d = \frac{\sum_{m=1}^{M} m\phi_{\hat{x}}(m)}{\sum_{m=1}^{M} m^2}$$

We therefore have the estimated frequency $\tilde{\omega}_d = 2\pi \tilde{f}_d$ defined by $$\tilde{\omega}_d = \frac{1}{\sum_{m=1}^{M} m^2} \sum_{m=1}^{M} m\phi_{\hat{x}}(m) = \frac{6}{M(M+1)(2M+1)} \sum_{m=1}^{M} m\phi_{\hat{x}}(m) \quad 35$$

The values $\phi_{\hat{x}}(m)$ are computed from the self-correlation values $r_{\hat{x}}(m)$ with $\phi_{\hat{x}}(m)$ defined by the imaginary part of the complex logarithm, or else again as arctg $$\left[\frac{Im r_{\hat{x}}(m)}{Re r_{\hat{x}}(m)}\right]$$

if Im $r_{\hat{x}}(m)$ corresponds to the imaginary part of $r_{\hat{x}}(m)$.
and Re$r_{\hat{x}}(m)$ corresponds to the real part of $r_{\hat{x}}(m)$.

According to one embodiment, the velocimeter probe of the invention comprises the following means in order to directly estimate $r_{\hat{x}}(m)$ from the $(2N+1)$ samples taken from the signal delivered by the photodetector with which the probe is fitted out.

means to compute the FFT of x(t) for N instants $t=-D, 0, +N$;
means to compute the values of the discrete spectrum $\check{X}(\omega)$ defined by $$\check{X}(\omega) = \begin{cases} 2|X(\omega)|^2 & \text{for } \omega > 0 \\ 0 & \text{for } \omega < 0 \end{cases}$$

means to compute the reverse FFT of $\hat{X}(\omega)$ with FFT$^{-1}$ $[\hat{X}(\omega)] = r_{\hat{x}}(m)$.

Thus with M self-correlation points $r_{\hat{x}}(m)$ and therefore M phases $\phi_{\hat{x}}(m)$ being known, it is possible to estimate $\tilde{\omega}_d$.

It can be shown that this estimation is the optimum for values $$N_{opt} \approx \frac{3}{2\alpha f_d} \approx \frac{3W}{2V}$$

and $$M_{opt} \approx \frac{N_{opt}}{3} = \frac{W}{2V}$$

if V$^-$ corresponds to the velocity of the particles in the volume of measurement.

What is claimed is:

1. An optical velocimeter probe comprising means to illuminate a volume of measurement in which there may pass particles in relative motion with respect to the probe, and means of optical detection to produce an electrical signal in response to the passage of a particle in the illuminated volume of measurement, the frequency spectrum of this signal having a width centered on a dominant frequency $f_o$ representing the relative velocity of the particle with respect to the probe, this probe lo comprising digital means to set up a vector x(t) representing N digital samples of the electrical signal detected, wherein said probe comprises:

means to convert the electrical signal x(t) into a complex signal $\hat{x}(t)$, having a real part and an imaginary part comprising a phase term dependent on $f_d$, means to set up a self-correlation function of the complex signal, said function being defined as follows:

$$r_{\hat{x}}(m) = \sum_{t=-N}^{N-m} E\{\hat{x}(t)\hat{x}(t+m)\}$$

where $E\{x\}$ designates the mathematical expectation of the variable x, means to determine the phase $\phi_{\hat{x}}(m)$ of the function $r_{\hat{x}}(m)$ dependent on the imaginary part of said function;

means to determine the frequency $f_d$ from the set of pairs $[m, \phi_{\hat{x}}(m)]$;

means to provide an indication of velocity v of a particle with respect to the probe on the basis of the frequency $f_d$.

2. An optical velocimeter probe according to claim 1, wherein the vector x(t) is defined by the following equation:

$$x(t) = A \cdot e^{-2\alpha^2 f^2 t^2} \cos(2\pi f t) + w(t)$$

where α a is a fixed coefficient,
  t denotes time,
  w(t) is a noise term.

3. An optical velocimeter probe according to claim 1, wherein the means for converting the real signal x(t) into a complex signal $\hat{x}(t)$ comprise Hilbert filter type means.

4. A velocimeter probe according to one of the claims 1 to 3, wherein the means use to define the complex function $\hat{x}(t)$ and the means used to define the function $\hat{r}_{\hat{x}}(m)$ comprise the following means:

Means to define the Fourier transform function x(ω) of the function x(t) on N samples;
means to elaborate the function $\hat{X}(\omega)$ such that
$\hat{x}(\omega) = 2|x(\omega)|^2$ if $\omega > 0$
$\hat{x}(\omega) = 0$ if $\omega < 0$
means to define the function $\hat{r}_{\hat{x}}(m) = FFT^{-1}[X(\omega)]$, if FFT$^{-1}$ designates the reverse Fourier transform.

5. A velocimeter probe according to claim 1, wherein the means to define the frequency $f_d$ include means to search for the frequency value for which the function $$J(f) = \sum_{m=1}^{M} |\hat{\phi_x}(m) - 2\pi m f|^2$$

is the minimum.

6. A velocimeter probe according to claim 5, wherein the value $f_o$ is estimated by $\tilde{f}_d$ $$2\pi \tilde{f}_d = \frac{6}{M(M+1)(2M+1)} \sum_{m=1}^{M} \hat{\phi_x}(m)$$

M being the number of self-correlation points.

7. A velocimeter probe according to one of the claims 1 to 3, wherein the phase $\phi_{\hat{x}}(m)$ is determined by the element arctan $$\frac{[Im \cdot \hat{r_x}(m)]}{[Re \cdot \hat{r_x}(m)]}$$

with

Im.$r_{\hat{x}}$(m): the imaginary part of $r_{\hat{x}}$(m)

Re.$r_{\hat{x}}$(m): the real part of $r_{\hat{x}}$(m).

* * * * *